United States Patent
Melanson et al.

(10) Patent No.: US 10,122,282 B2
(45) Date of Patent: Nov. 6, 2018

(54) ISOLATION OF SECONDARY TRANSFORMER WINDING CURRENT DURING AUXILIARY POWER SUPPLY GENERATION

(71) Applicant: PHILIPS LIGHTING HOLDING B.V., Eindhoven (NL)

(72) Inventors: John L. Melanson, Austin, TX (US); Prashanth Drakshapalli, Austin, TX (US); Siddharth Maru, Austin, TX (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/336,835

(22) Filed: Oct. 28, 2016

(65) Prior Publication Data

US 2017/0047850 A1 Feb. 16, 2017

Related U.S. Application Data

(62) Division of application No. 13/715,451, filed on Dec. 14, 2012, now Pat. No. 9,484,832.

(Continued)

(51) Int. Cl.
*H02M 3/335* (2006.01)
*H05B 33/08* (2006.01)
(Continued)

(52) U.S. Cl.
CPC ..... *H02M 3/33507* (2013.01); *H02M 1/4258* (2013.01); *H02M 1/44* (2013.01); *H02M 3/33523* (2013.01); *H02M 5/2576* (2013.01); *H02M 7/217* (2013.01); *H05B 33/0815* (2013.01); *H05B 33/0845* (2013.01); *H05B 37/02* (2013.01); *H02M 3/33561* (2013.01); *H02M 3/33576* (2013.01); *H02M 2001/0006* (2013.01); *H02M 2001/0048* (2013.01); *Y02B 20/346* (2013.01); *Y02B 20/347* (2013.01); *Y02B 70/126* (2013.01); *Y02B 70/1491* (2013.01)

(58) Field of Classification Search
CPC ....... H02M 2001/006; H02M 3/33576; H02M 3/33561; H02M 3/33523
See application file for complete search history.

(56) References Cited

U.S. PATENT DOCUMENTS 4,683,529 A   7/1987   Bucher
5,014,178 A   5/1991   Balakrishnan
(Continued)

*Primary Examiner* — Harry Behm

(57) ABSTRACT

An electronic system and method include a controller to actively control power transfer from a primary winding of a switching power converter to an auxiliary-winding of an auxiliary power supply. The switching power converter is controlled and configured such that during transfer of power to the auxiliary-winding, the switching power converter does not transfer charge to one or more secondary-windings of the switching power converter. Thus, the switching power converter isolates one or more secondary transformer winding currents from an auxiliary-winding current. By isolating the charge delivered to the one or more secondary-windings from charge delivered to the auxiliary-winding, the controller can accurately determine an amount of charge delivered to the secondary-windings and, thus, to a load.

13 Claims, 5 Drawing Sheets

Related U.S. Application Data

(60) Provisional application No. 61/570,554, filed on Dec. 14, 2011.

(51) Int. Cl.
    *H02M 1/44*     (2007.01)
    *H02M 5/257*     (2006.01)
    *H02M 7/217*     (2006.01)
    *H05B 37/02*     (2006.01)
    *H02M 1/42*     (2007.01)
    *H02M 1/00*     (2006.01)

(56) References Cited

U.S. PATENT DOCUMENTS

| | | | |
|---|---|---|---|
| 5,285,369 | A * | 2/1994 | Balakrishnan .................. 363/49 |
| 5,319,301 | A | 6/1994 | Callahan |
| 5,321,350 | A | 6/1994 | Haas |
| 5,459,652 | A * | 10/1995 | Faulk ..................... H02M 1/36 |
| | | | 323/901 |
| 5,479,333 | A | 12/1995 | McCambridge et al. |
| 5,581,453 | A | 12/1996 | Ueta et al. |
| 5,770,928 | A | 6/1998 | Chansky |
| 5,812,383 | A | 9/1998 | Majid et al. |
| 5,812,385 | A | 9/1998 | Leu |
| 5,834,858 | A | 11/1998 | Crosman et al. |
| 5,874,725 | A | 2/1999 | Yamaguchi |
| 5,880,942 | A | 3/1999 | Leu |
| 5,901,051 | A | 5/1999 | Takahashi |
| 6,134,123 | A | 1/2000 | Yamada |
| 6,043,635 | A | 3/2000 | Downey |
| 6,125,046 | A | 9/2000 | Jang et al. |
| 6,160,724 | A | 12/2000 | Hemena et al. |
| 6,172,883 | B1 * | 1/2001 | Kates et al. ............... 363/21.18 |
| 6,181,114 | B1 | 1/2001 | Hermena et al. |
| 6,369,525 | B1 | 4/2002 | Chin et al. |
| 6,646,848 | B2 | 11/2003 | Yoshida et al. |
| 6,839,247 | B1 | 1/2005 | Yang et al. |
| 6,842,353 | B2 | 1/2005 | Yamada |
| 6,912,140 | B2 | 6/2005 | Kasai et al. |
| 6,963,496 | B2 | 11/2005 | Bimbaud |
| 6,980,446 | B2 | 12/2005 | Simada et al. |
| 7,012,818 | B2 | 3/2006 | Kotsuji et al. |
| 7,064,531 | B1 | 6/2006 | Zinn |
| 7,099,163 | B1 | 8/2006 | Ying |
| 7,106,603 | B1 | 9/2006 | Lin et al. |
| 7,136,292 | B1 | 11/2006 | Chan et al. |
| 7,184,937 | B1 | 2/2007 | Su |
| 7,221,128 | B2 | 5/2007 | Usui et al. |
| 7,345,458 | B2 | 3/2008 | Kanai et al. |
| 7,352,595 | B2 | 4/2008 | Yang et al. |
| 7,394,668 | B2 | 7/2008 | Nakajima |
| 7,394,670 | B2 | 7/2008 | Koike |
| 7,468,896 | B2 | 12/2008 | Gong et al. |
| 7,606,532 | B2 | 10/2009 | Wuidart |
| 7,684,223 | B2 | 3/2010 | Wei |
| 7,843,017 | B2 | 11/2010 | Cheng |
| 8,031,494 | B2 | 10/2011 | Brkovic |
| 8,169,803 | B2 | 5/2012 | Huang et al. |
| 8,279,631 | B2 | 10/2012 | Yang |
| 8,305,001 | B2 | 11/2012 | Horiuchi et al. |
| 8,325,502 | B2 | 12/2012 | Gaombanco et al. |
| 8,379,414 | B2 | 2/2013 | Huang et al. |
| 8,461,818 | B1 | 6/2013 | Benes |
| 2003/0174520 | A1 | 9/2003 | Bimbaud |
| 2004/0240233 | A1 | 12/2004 | Disney |
| 2005/0088862 | A1 | 12/2005 | Shimada et al. |
| 2006/0018136 | A1 * | 1/2006 | Takahashi ......... H02M 3/33523 |
| | | | 363/21.15 |
| 2006/0126368 | A1 | 6/2006 | Rapeanu |
| 2006/0285365 | A1 | 12/2006 | Huynh et al. |
| 2007/0103134 | A1 | 5/2007 | Yang et al. |
| 2007/0121350 | A1 * | 5/2007 | Duvnjak .................... 363/21.01 |
| 2007/0159856 | A1 | 7/2007 | Ta-Yung |
| 2008/0101098 | A1 | 5/2008 | Disney |
| 2008/0304293 | A1 | 12/2008 | Constantin et al. |
| 2009/0135632 | A1 | 5/2009 | Sohma |
| 2009/0190379 | A1 | 7/2009 | Melanson et al. |
| 2010/0213859 | A1 | 8/2010 | Shteynberg et al. |
| 2010/0271850 | A1 | 10/2010 | Huang et al. |
| 2010/0309689 | A1 | 12/2010 | Coulson |
| 2010/0327838 | A1 | 12/2010 | Melanson |
| 2011/0018590 | A1 | 1/2011 | Tai et al. |
| 2011/0193488 | A1 * | 8/2011 | Kanamori ......... H05B 33/0809 |
| | | | 315/209 R |

\* cited by examiner

US 10,122,282 B2

ISOLATION OF SECONDARY TRANSFORMER WINDING CURRENT DURING AUXILIARY POWER SUPPLY GENERATION

CROSS-REFERENCE TO RELATED APPLICATION

This application claims the benefit under 35 U.S.C. § 119(e) and 37 C.F.R. § 1.78 of U.S. Provisional Application No. 61/570,554, filed on Dec. 14, 2011, and under 35 U.S.C. § 121 of U.S. application Ser. No. 13/715,451, which are incorporated by reference in their entirety.

BACKGROUND OF THE INVENTION

Field of the Invention

The present invention relates in general to the field of electronics, and more specifically to a system and method for isolating secondary transformer winding current during auxiliary power supply generation with an auxiliary-winding of the transformer.

Description of the Related Art

Many electronic systems include circuits, such as switching power converters to provide efficient power conversion from a voltage supply into a regulated output voltage. Often, a controller controls the power conversion process of a switching power converter. The switching power converter converts input power from a supply voltage source into an amount of output power utilized by a load. The controller utilizes a supply voltage derived from the same supply voltage being converted by the switching power converter.

FIG. 1 depicts a flyback-type switching power converter 100 that converts the input voltage $V_{IN}$ into a constant current $i_S$ and load voltage $V_{LD}$ on the side of the secondary-winding 116 of the transformer 112 and to a converter supply voltage $V_{DD}$ on the side of the auxiliary-winding 124. In at least one embodiment, the input voltage $V_{IN}$ is a rectified nominally 60 Hz/110 V line voltage in the United States of America or a nominally 50 Hz/220 V line voltage in Europe and the People's Republic of China. The controller 102 generates a switch control signal CNTRL to control the flyback-type, switching power converter 104. The control signal CNTRL controls the conductivity of field effect transistor (FET) switch 106 to control the primary current $i_P$ to meet the power demands of load 108. For an n-channel FET, the FET conducts (i.e. ON) when the switch control signal CNTRL is a logical one and is nonconductive (i.e. OFF) when the switch control signal CNTRL is a logical zero.

When the FET 106 conducts, the primary current $i_P$ ramps up through the primary winding 110 of transformer 112. The dot convention of transformer 112 and the diode 114 prevent flow of the secondary current $i_S$ from the secondary-winding 116 when FET 106 conducts and the primary current $i_P$ is flowing into the primary winding 110. When the controller 102 generates the switch control signal CNTRL to turn FET 106 OFF, the primary current $i_P$ falls to 0, and the voltage across the primary winding 110 reverses (also referred to as "flyback"). During the flyback, the secondary current $i_S$ quickly rises and charges capacitor 118. Capacitor 118 provides an output voltage $V_{LD}$ and current to the load 108. The load can be any type of load including one or more light emitting diodes. A diode and resistor-capacitor filter circuit 120 provides a path for voltage perturbations.

After the switching power converter 104 begins operation, an auxiliary power supply 122 provides the supply voltage $V_{DD}$ for controller 102. The auxiliary power supply 122 includes an auxiliary-winding 124 with the same dot convention as the secondary-winding 116. The FET 126 is biased by a fixed gate voltage $V_G$ to conduct the auxiliary current $i_{AUX}$ through diode 130 and resistor 132 to the $V_{DD}$ voltage node. When the controller supply voltage $V_{DD}$ falls below the gate voltage $V_G$ minus a threshold voltage $V_{TH}$ of the FET 126, the FET 126 conducts and charges the $V_{DD}$ node, which charges capacitor 128. When the voltage $V_{DD}$ reaches $V_G+V_{TH}$, the FET 126 stops conducting. Capacitor 128 stores energy to assist in providing a relatively constant value of the controller supply voltage $V_{DD}$.

The controller supply voltage $V_{DD}$ varies in accordance with varying power demands by controller 102. Thus, the auxiliary power supply 126 provides power to the controller 102 in accordance with the varying power demands of controller 102. When the auxiliary power supply 126 provides charge to the capacitor 128, the auxiliary power supply 126 takes charge from the primary winding 110 that would otherwise be provided to the secondary-winding 116. Since the power demands of the auxiliary power supply 122 are not monitored, the amount of power actually delivered to the secondary-winding 116 and, thus, the load 108 is not accurately known.

SUMMARY OF THE INVENTION

In one embodiment of the present invention, a method includes transferring energy from a primary winding of a transformer of a switching power converter to a secondary-winding and to an auxiliary-winding for an auxiliary power supply during mutually exclusive periods of time. The transferring of energy includes at least controlling a first value of a reflected voltage of the auxiliary-winding of the transformer to be lower than a reflected voltage of the secondary-winding of the transformer during transfer of energy to the auxiliary-winding. The transferring of energy also includes controlling a second value of the reflected voltage of the auxiliary-winding of the transformer to be greater than the reflected voltage of the secondary-winding of the transformer during transfer of energy to the secondary-winding.

In another embodiment of the present invention, an apparatus includes a controller to at least control a transfer of energy from a primary winding of a transformer of a switching power converter and to an auxiliary-winding for an auxiliary power supply during mutually exclusive periods of time. To control the transfer of energy, the controller is configured to at least control a first value of a reflected voltage of the auxiliary-winding of the transformer to be lower than a reflected voltage of the secondary-winding of the transformer during transfer of energy to the auxiliary-winding. To control the transfer of energy, the controller is further configured to control a second value of the reflected voltage of the auxiliary-winding of the transformer to be greater than the reflected voltage of the secondary-winding of the transformer during transfer of energy to the secondary-winding.

In a further embodiment of the present invention, an apparatus includes a flyback type switching power converter. The switching power converter includes a transformer having a primary-winding, a secondary-winding, and an auxiliary-winding. The apparatus further includes a first switch coupled to the primary-winding and an auxiliary power supply that includes auxiliary power supply control circuitry coupled to the primary-winding. The apparatus further includes a controller coupled to the first switch to (i)

control the switch and current in the primary-winding and (ii) control the auxiliary power supply circuitry to isolate a transfer of energy from the primary-winding to the secondary-winding from a transfer of energy from the primary-winding to the secondary-winding.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An electronic system and method include a controller to actively control power transfer from a primary winding of a switching power converter to an auxiliary-winding of an auxiliary power supply. The switching power converter is controlled and configured such that during transfer of power to the auxiliary-winding, the switching power converter does not transfer charge to one or more secondary-windings of the switching power converter. Thus, the switching power converter isolates one or more secondary transformer winding currents from an auxiliary-winding current. By isolating the charge delivered to the one or more secondary-windings from charge delivered to the auxiliary-winding, the controller can accurately determine an amount of charge delivered to the secondary-windings and, thus, to a load.

Figure 1:
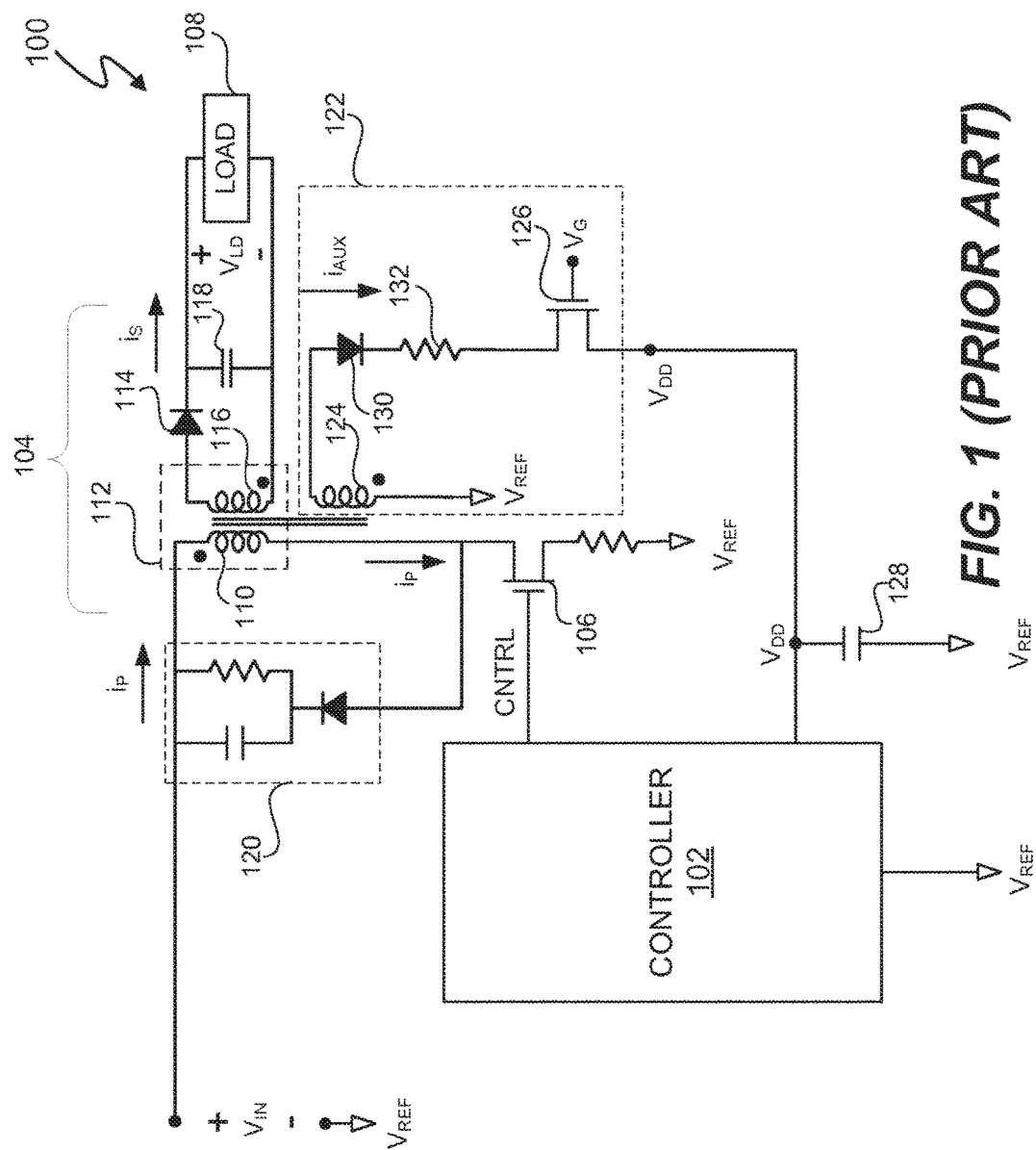
FIG. 1 (labeled prior art) depicts a flyback-type switching power converter and an auxiliary power supply.
Figure 2:
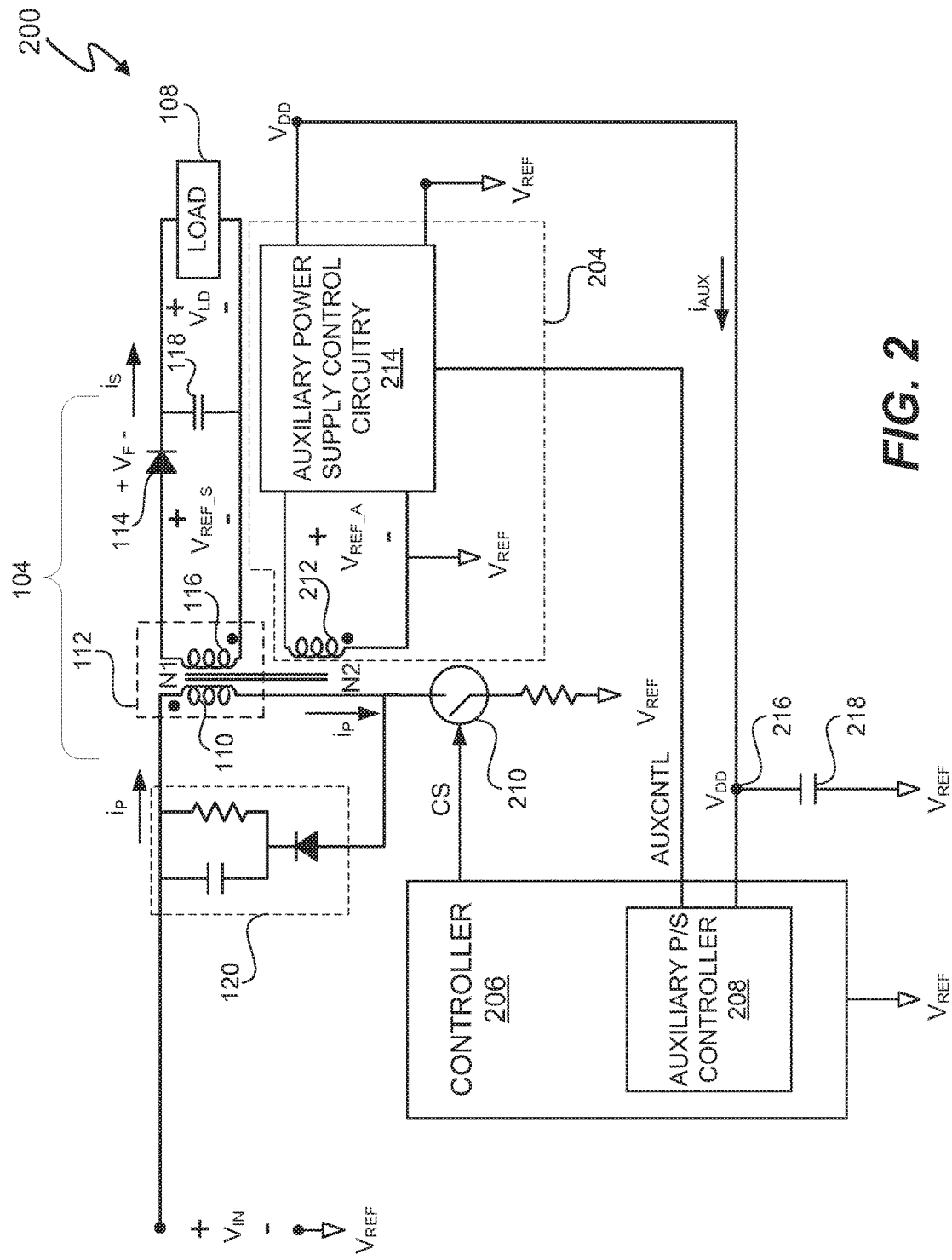
FIG. 2 depicts an electronic system having an actively controlled auxiliary power supply with secondary transformer winding current isolation during auxiliary power supply power generation.

FIG. 2 depicts an electronic system 200 having an actively controlled auxiliary power supply 204 with secondary transformer winding current $i_S$ isolation during auxiliary power supply power generation. The electronic system 200 includes the flyback-type switching power converter 104, which functions as previously described. The electronic system 200 also includes an actively controllable auxiliary power supply 204 that supplies power to the controller 206. The auxiliary power supply 204 is "actively controllable" because the auxiliary power supply controller 208 controls when the auxiliary power supply 204 generates and does not generate power. In at least one embodiment, an auxiliary power supply controller 208 controls power generation by the auxiliary power supply 204 by generating a control signal AUXCNTL that controls when the auxiliary power supply 204 generates power. In at least one embodiment, the auxiliary power supply controller 208 is incorporated into controller 206; although whether the auxiliary power supply controller 208 is integrated as part of the controller 206 or separate from the controller is a matter of design choice.

In at least one embodiment, the controller 206 operates to control transfer of a known, average quantity of charge to the load 108 during a period of time. The average quantity of charge to be delivered to the load 108 can change over time. For example, the controller 206 may be instructed, such as by a dimmer (e.g. dimmer 304 in FIG. 3), to modify the average quantity of charge provided to the load 108. For example, in at least one embodiment, the input voltage $V_{IN}$ is a rectified, time-varying (AC) voltage that can be modified, such as with a dimmer. When the input voltage $V_{IN}$ is modified, a particular response by the load 108, such as dimming of a lamp, is expected. To achieve a particular static and dynamic response of the load 108, the controller 206 operates to precisely as possible control the charge delivered to the load 108.

However, the switching power converter 104 does not deliver all charge to the load 108. The primary-side winding 110 delivers charge to both the secondary-winding 116 and the auxiliary-winding 212. Thus, in at least one embodiment, to precisely determine the amount of charge the switching power converter 104 delivers to the load 108, in at least one embodiment, the controller 206 ensures that the times when charge is delivered to the secondary-winding 116 and to the auxiliary-winding 212 are known and mutually exclusive. The auxiliary power supply controller 208 and the actively controllable auxiliary power supply 204 allow the controller 206 to isolate the charge transferred to the load 108 from the charge transferred to the auxiliary power supply 204. By isolating the charge deliveries, the amount of charge transferred to the load 108 is not affected by the amount of charge transferred to the auxiliary power supply 204, and the controller 206 can, thus, determine the amount of charge the switching power converter 104 delivers to the load 108.

To isolate the charge transfer between the secondary-winding 116 and the auxiliary-winding 212, in at least one embodiment, the controller 206 controls mutually exclusive times for the transfer of energy from the primary-winding 110 of the transformer 112 to the secondary-winding 116 and to the auxiliary-winding 212 for the auxiliary power supply 204. For example, during a first period of time, the controller 206 controls the transfer of energy from the primary-winding 110 of the transformer 112 to the secondary-winding 116. During a second period of time, the controller 206 actively controls transfer of energy from the primary-winding 110 to the auxiliary-winding 212 without transferring any energy to the secondary-winding. In at least one embodiment, the system 200 achieves an isolation between transfer of energy to the secondary-side winding 116 and to the auxiliary-winding 212 by ensuring that a value of a reflected voltage $V_{REF\_S}$ across the secondary-winding 116 is greater than a value of a reflected voltage $V_{REF\_A}$ across the auxiliary-winding 212 when transferring energy to the auxiliary-winding 212 and, conversely, by providing a high impedance current path for an auxiliary current $i_{AUX}$ when transferring energy to the secondary-winding 212.

The controller 206 generates a control signal CS to control switch 210 and, thereby, control flow of primary-side current $i_P$ into the primary-side coil 110. In at least one embodiment, the switch 210 is a FET. When switch 210 conducts, the primary-side current $i_P$ energizes primary-side winding 110, and when switch 210 stops conducting, the polarity of the voltage across the primary-side winding reverses and will begin to ramp down as energy is transferred to either the secondary-winding 116 or to the auxiliary-winding 212. The energy transfer is not instantaneous.

The secondary-side current $i_S$ transfers charge to the load 108 only when diode 114 is forward biased. Diode 114 is forward biased only when the reflected voltage $V_{REF\_S}$ is greater than the forward bias voltage $V_F$ of diode 114 plus the load voltage $V_{LD}$. The forward bias voltage $V_F$ of diode 114 is generally less than or equal to 1V, such as 0.7V. The auxiliary power controller 208 controls the reflected voltage across the auxiliary-winding 212 by controlling the auxiliary power supply control circuitry 214. In at least one embodiment, when the auxiliary power supply controller 208 asserts the auxiliary voltage control signal AUXCNTL, the auxiliary power supply control circuitry 214 provides a low impedance path from the auxiliary-winding 212 to the node 216. The low impedance path keeps the reflected voltage $V_{REF\_A}$ at the voltage level $V_{DD}$ across the capacitor 218. The auxiliary power supply controller 208 controls the auxiliary power supply control circuitry 214 so that when energy is transferred from the primary-winding 110 to the auxiliary-winding 212, the reflected voltage $V_{REF\_A}$ is less than the value of the forward bias voltage $V_F$ of diode 114 plus the load voltage $V_{LD}$, i.e. when the signal AUXCNTL is asserted, $V_{REF\_A} < (V_F + V_{LD})$. Thus, since the flyback voltage across the primary-winding 110 does not rise instantaneously, the reflected voltage $V_{REF\_A}$ will remain less than $(V_F + V_{LD})$ as the primary-winding 110 transfers energy to the auxiliary-winding 212. Since the reflected voltage $V_{REF\_A}$ will remain less than $(V_F + V_{LD})$, diode 114 will be reversed biased, and the secondary current $i_S$ will not flow. Thus, no charge is transferred to the load 108 when the auxiliary power supply controller 208 asserts the auxiliary voltage control signal AUXCNTL.

Conversely, in at least one embodiment, when the auxiliary power supply controller 208 deasserts the auxiliary voltage control signal AUXCNTL, the auxiliary power supply control circuitry 214 raises an impedance of the auxiliary power supply 204 to a value that prevents most if not all energy transfer to the auxiliary-winding 212. Thus, the primary-winding 110 transfers all energy to the secondary-winding 116. The auxiliary power supply control circuitry 214 raises an impedance of the auxiliary power supply 204 by causing the FET 320 to stop conducting and become an open circuit between the diode 324 and the capacitor 218. When all energy is transferred to the secondary-side winding, the diode 114 is forward biased, and the secondary-side current $i_S$ delivers all the charge from the primary-winding 110 to the secondary-winding and then to the load 118. Since the auxiliary power supply controller 208 can control mutually exclusive energy transfer to the load 108 and to the auxiliary power supply 204, the controller 206 can determine very precisely the amount of charge delivered to the load 108.

When all energy is transferred to the secondary-winding 116, the auxiliary power supply controller 208 controls the auxiliary power supply circuitry 214 so that the reflected voltage $V_{REF\_A}$ is less than the value of the forward bias voltage $V_F$ of diode 114 plus the load voltage $V_{LD}$, i.e. when the signal AUXCNTL is asserted, $V_{REF\_A} < (V_F + V_{LD})$. Thus, since the flyback voltage across the primary-winding 110 does not rise instantaneously, the reflected voltage $V_{REF\_A}$ will remain less than $(V_F + V_{LD})$ as the primary-winding 110 transfers energy to the auxiliary-winding 212. Since the reflected voltage $V_{REF\_A}$ will remain less than $(V_F + V_{LD})$, diode 114 will be reversed biased, and the secondary current $i_S$ will not flow. Thus, no charge is transferred to the load 108 when the auxiliary power supply controller 208 asserts the auxiliary voltage control signal AUXCNTL.

The reflected voltage $V_{REF\_S}$ is determined in accordance with Equation 1:

$$V_{REF\_S} = V_{LD} * N1 \qquad \text{Equation 1}$$

$V_{REF\_S}$ is the reflected voltage due to the secondary-winding 116, $V_{LD}$ is the voltage across the load 108, and N1 is the turns ratio between the secondary-winding 116 and the primary-winding 110.

The reflected voltage reflected voltage $V_{REF\_A}$ when the auxiliary power supply control signal AUXCNTL is asserted is determined in accordance with Equation 2:

$$V_{REF\_A} = V_{DD} * N2 \qquad \text{Equation 2}$$

$V_{REF\_A}$ is the reflected voltage due to the auxiliary-winding 212 of the auxiliary power supply 204, $V_{DD}$ is the voltage across the auxiliary power supply 204 when the auxiliary power supply control signal AUXCNTL is asserted, and N2 is the turns ratio between the auxiliary-winding 212 and the primary-winding 110.

The controller 206 operates from a supply voltage $V_{DD}$, and the auxiliary power supply 204 provides the supply voltage $V_{DD}$ during at least post-startup operation of the controller 206. During operation of the auxiliary power supply 204, the auxiliary power supply current $i_{AUX}$ charges node 216 to voltage $V_{DD}$. The supply capacitor 218 stores charge to maintain an approximately constant supply voltage $V_{DD}$ for controller 206. When the auxiliary power supply 204 is not operating, the controller 206 depletes charge from capacitor 218, and the voltage $V_{DD}$ decreases. The rate of decrease of charge from capacitor 218 varies as the power demands of controller 206 vary. In at least one embodiment, when the voltage $V_{DD}$ decreases below a predetermined threshold level, the auxiliary power supply controller 208 asserts the auxiliary power supply control signal AUXCNTL to activate the auxiliary power supply 204. Upon activation, the auxiliary power supply 204 receives energy from the primary-side winding 110 during a flyback period of the transformer 112. By actively controlling the auxiliary power supply 204 and isolating charge transfer to the load 108 from charge transfer to the auxiliary power supply 204, in at least one embodiment, the controller 206 controls and, is thus aware of, when the auxiliary power supply 204 receives charge and when the secondary-winding 116 is not receiving charge. Thus, the controller 206 can determine with a high degree of precision the amount of charge delivered to the load 108.

In at least one embodiment, the controller 206 controls switch 210 so that the switching power converter 104 transfers charge to the secondary-winding 116 until a predetermined charge target ($Q_{target}$) is met. Controller 206 determines the amount of charge transferred in each cycle of the switch 210 in accordance with Equation 3:

$$Q_{transferred} = \left(\frac{N1}{2}\right) \times I_{peak} \times T_2 \qquad 3$$

N1 is the turns ratio between the secondary-winding 116 and the primary-winding 110, $I_{peak}$ is the peak value of the primary-side current $i_P$, and $T_2$ is the off time of switch 210 until the primary-side current $i_P$ decays to zero or until a new cycle of the control signal CS begins, whichever occurs first. Controller 206 determines the accumulated, transferred charge for 1 through M cycles of the input voltage $V_{IN}$ in accordance with Equation Equation 4, where M is a positive integer:

$$Q_{total\_transferred} = \Sigma_1^M \left(\frac{N1}{2}\right) \times I_{peak} \times T_2 \qquad \text{Equation 4}$$

Controller 206 continues to transfer charge to the secondary-winding 116 until the accumulated, transferred charge equals $Q_{target}$. By isolating the transfer of charge to the secondary-winding 116 and the auxiliary-winding 212, the controller 206 can determine precisely the accumulated amount of charge transferred to the load 108. Thus, the amount of charge transferred to the load 108 is not affected by the amount of charge transferred to the auxiliary power supply 204.

The manner of generating the control signal CS is a matter of design choice. In at least one embodiment, the control signal CS is generated as described in U.S. patent application Ser. No. 12/919,086, entitled "Primary-Side Control of a Switching Power Converter With Feed Forward Delay Compensation", inventors Zhaohui He, et al., and filing date Jun. 1, 2012, which is hereby incorporated by reference in its entirety.

Figure 3:
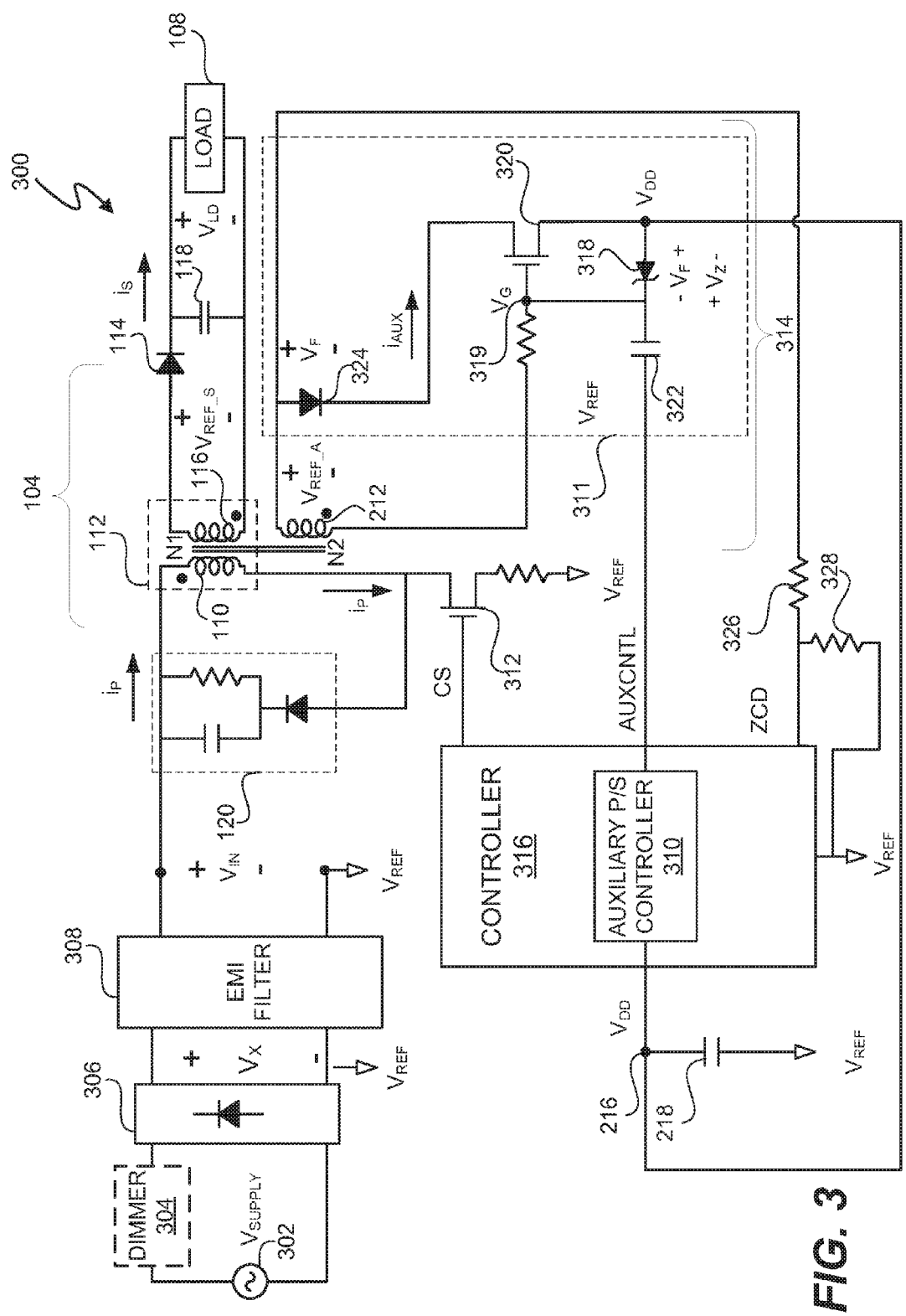
FIG. 3 depicts an embodiment of the electronic system of FIG. 3.

FIG. 3 depicts an electronic system 300, which represents one embodiment of the electronic system 200. Voltage source 302 generates a supply voltage $V_{SUPPLY}$, such as a nominally 60 Hz/110 V alternating current (AC) line voltage in the United States of America or a nominally 50 Hz/220 V AC line voltage in Europe and the People's Republic of China. An optional dimmer 304, such as a triac-based dimmer, phase cuts the supply voltage $V_{SUPPLY}$, and full-bridge rectifier 306 generates a rectified AC voltage $V_X$ as an input voltage to electromagnetic interference (EMI) filter 308. Voltage $V_{IN}$ represents the input voltage to the flyback switching power converter 104. The flyback switching power converter 104 operates as previously described.

The electronic system 300 controls the transfer of energy from the primary-winding 110 of the transformer 112 to the secondary-winding 116 and to the auxiliary-winding 212 for the auxiliary power supply 314 during mutually exclusive periods of time by at least controlling a first value of the reflected voltage $V_{REF\_A}$ across the auxiliary-winding 212 to be lower than the reflected voltage $V_{REF\_S}$ across the secondary-winding 116 during transfer of energy to the auxiliary-winding 212. The electronic system 300 also controls the value of the reflected voltage $V_{REF\_A}$ to be greater than the reflected voltage $V_{REF\_S}$ during transfer of energy to the secondary-winding 116. Since transfer of energy to the secondary-winding 116 and to the auxiliary-winding 212 occurs during mutually exclusive periods of time, the controller 316 can precisely determine the accumulated amount of charge transferred to the secondary-winding 116 in accordance with Equation 4.

Figure 4:
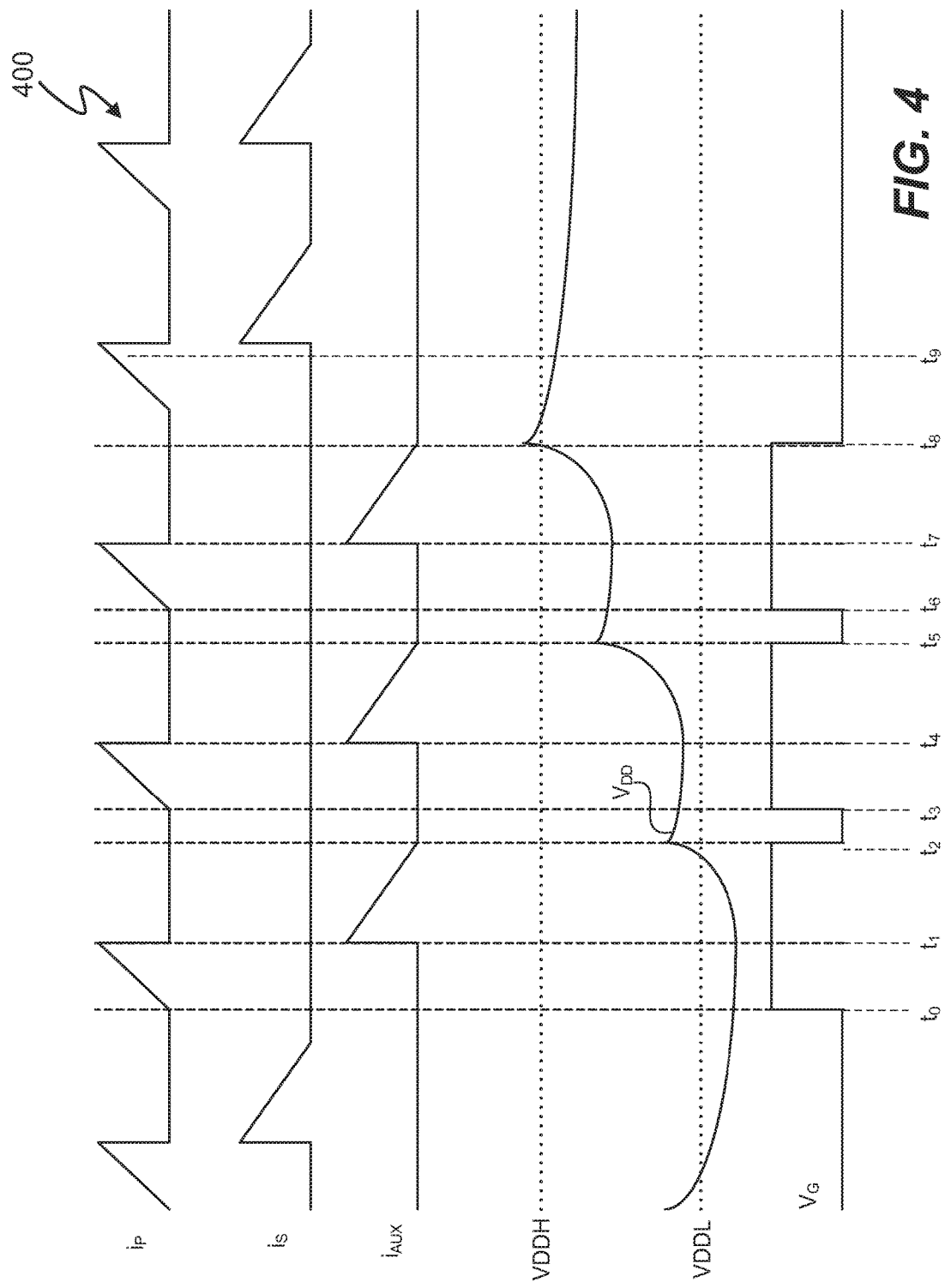
FIG. 4 depicts exemplary waveforms for the electronic system of FIG. 3.

FIG. 4 depicts exemplary waveforms 400 during the operation of electronic system 300. Referring to FIGS. 3 and 4, the auxiliary power supply controller 310 controls the auxiliary power supply control circuitry 311. The auxiliary power supply control circuitry 311 represents one embodiment of the auxiliary power supply control circuitry 214. Auxiliary power supply controller 310 controls the reflected voltage $V_{REF\_A}$ by asserting and deasserting the auxiliary power supply control signal AUXCNTL. In at least one embodiment, a deasserted auxiliary power supply control signal AUXCNTL is approximately 0V. Prior to time $t_0$, the auxiliary power supply control signal AUXCNTL is 0V, and the Zener diode 318 is forward biased and has a normal forward voltage drop $V_F$ of less than or equal to +1V. The gate 319 of the FET 320 is a current control node of the FET 320. Prior to time $t_0$, the gate voltage $V_G$ of FET 320 equals $V_{DD} - V_F$. Since the gate voltage $V_G$ is less than the source voltage $V_{DD}$ of FET 320, FET 320 does not conduct during a deassertion of auxiliary power supply control signal AUXCNTL. The impedance of the auxiliary power supply 314 is virtually infinity due to the open circuit of nonconducting FET 320, and, thus, the auxiliary current $i_{AUX}$ is zero, and no energy is transferred to the auxiliary power supply 314.

Thus, when the auxiliary power supply controller 310 deasserts the auxiliary power supply control signal AUXCNTL, flyback switching power converter 104 transfers all the energy from the primary-winding 110 to the secondary-winding 116.

In at least one embodiment, the system 300 also optionally includes a voltage divider configured from resistors 326 and 328. In at least one embodiment, the voltage divider has a relatively high impedance and conducts a negligible amount of current. Signal ZCD represents the voltage across resistor 328, and the signal ZCD is used by the controller to detect a zero crossing in the input voltage $V_{IN}$.

Figure 5:
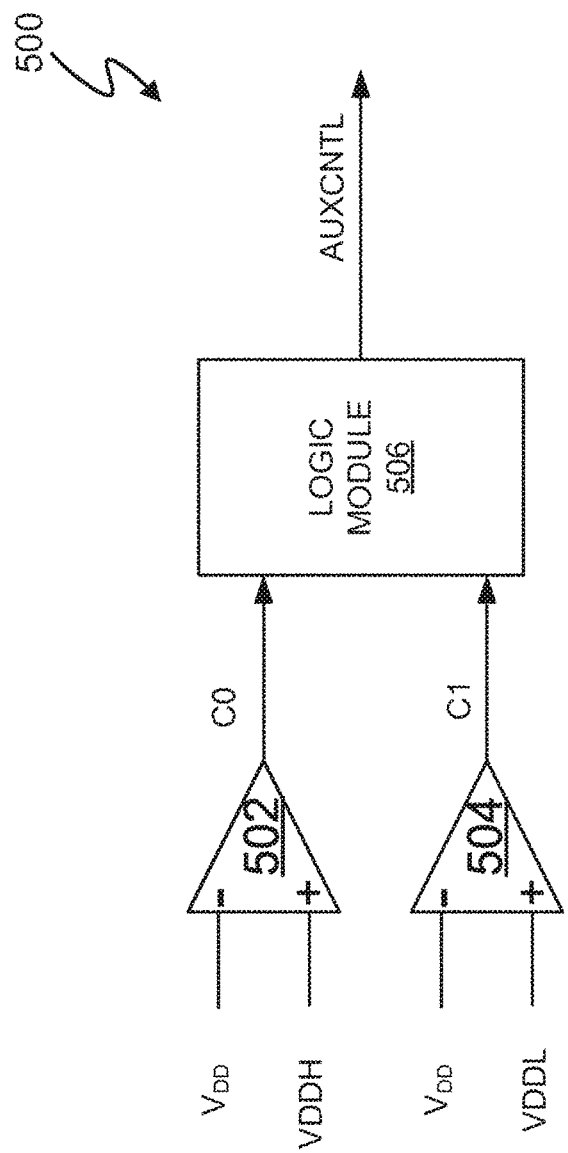
FIG. 5 depicts an embodiment of auxiliary power supply control circuitry.

In at least one embodiment, the auxiliary power supply controller 310 is a hysteretic controller, such as the hysteretic controller in FIG. 5, and determines when to assert and deassert the auxiliary power supply control signal AUXCNTL. In at least one embodiment, the auxiliary power supply controller 310 asserts the auxiliary power supply control signal AUXCNTL when the supply voltage $V_{DD}$ falls below a minimum voltage threshold level VDDL, and deasserts the auxiliary power supply control signal AUXCNTL when the supply voltage rises above a maximum voltage threshold level VDDH. The difference between the values of VDDH and VDDL is a matter of design choice. Additionally, in at least one embodiment, to maintain a tighter control of the supply voltage $V_{DD}$, the auxiliary supply controller 310 maintains the supply voltage $V_{DD}$ approximately constant.

At time $t_0$, the supply voltage $V_{DD}$ has dropped below a minimum threshold voltage value VDDL, and auxiliary power supply controller 310 asserts the auxiliary power supply control signal AUXCNTL. An asserted auxiliary power supply control signal AUXCNTL has a value of $V_{DD}$, which shifts the voltage across capacitor 322 and reverse biases the Zener diode 318. The Zener voltage $V_Z$ of Zener diode 318 is greater than the threshold voltage of the FET 320. Thus, when the Zener diode 318 is reverse biased, the gate voltage $V_G$ rises to near $V_{DD} \cdot V_Z$, such as +12V, and the FET 320 conducts. When the FET 320 conducts, a low impedance current path for auxiliary current $i_{AUX}$ is available through diode 324 and FET 320. At time $t_0$, control signal CS is a logical one, and FET 312 conducts the primary current $i_P$ through the primary-winding 110.

At time $t_1$, the primary current $i_P$ reaches a peak value, control signal CS deasserts to a logical zero, and the primary-winding voltage reverses. When the primary-winding voltage reverses, the low impedance path through diode 324 and FET 320 causes the reflected voltage reflected voltage $V_{REF\_A}$ to be approximately $V_{DD}$ plus the forward biased diode voltage drop $V_F$ across diode 324. When the reflected voltage $V_{REF\_A}$ equals $N2 \cdot V_{DD} + V_F$, the reflected voltage $V_{REF\_A}$ is less than the reflected voltage $V_{REF\_S}$. Accordingly, the primary-winding 110 transfers all energy to the auxiliary power supply 314. As energy and, thus, charge is transferred to the auxiliary power supply 314, the auxiliary current $i_{AUX}$ charges the node 216 and capacitor 218. Charge is transferred to the node 216 until the auxiliary current $i_{AUX}$ decreases to 0 at time $t_2$. The supply voltage $V_{DD}$ decreases between times $t_2$ and $t_3$ as the controller 316 utilizes charge stored by capacitor 218. Between times $t_3$ and $t_8$, the process of transferring charge only to the auxiliary power supply 314 continues.

At time $t_8$, the auxiliary power supply controller 310 detects that the supply voltage $V_{DD}$ is greater than a maximum threshold voltage value VDDH. After the supply $V_{DD}$ is equal to or greater than the maximum threshold voltage value VDDH and all the present amount of charge on the primary-winding 110 has been transferred to the auxiliary-winding, the auxiliary power supply controller 310 deasserts the auxiliary power supply control signal AUXCNTL to approximately 0V. Deasserting the auxiliary power supply control signal AUXCNTL forward biases the Zener diode 318, which causes FET 320 to stop conducting the auxiliary current $i_{AUX}$. Then, as previously described, during a flyback period when the primary-winding voltage reverses at, for example, time $t_9$, the primary-winding 110 transfers all energy to the secondary-winding 116. Transferring all the energy from the primary-winding 110 to the secondary-winding 116 continues until the auxiliary power supply controller 310 again detects that the supply voltage $V_{DD}$ has decreased below the minimum voltage threshold value VDDL. Then the process as described between times $t_0$ and $t_8$ repeats. The frequency of the pulses of the gate voltage is a matter of design choice. In at least one embodiment, the frequency is at least 10 kHz, and in at least one embodiment, the frequency is at least 20 kHz.

FIG. 5 depicts an auxiliary power supply controller 500, which represents one embodiment of the auxiliary power supply controller 310. The auxiliary power supply controller 500 is a hysteretic controller and includes two comparators 502 and 504 to respectively compare the supply voltage $V_{DD}$ with the maximum voltage threshold value VDDH and the minimum voltage threshold value VDDL. The output C0 of comparator 502 is a logical 1 until the supply voltage $V_{DD}$ is greater than the maximum voltage threshold value VDDH. When the supply voltage $V_{DD}$ is less than the maximum voltage threshold value VDDH, the output C0 is a logical 0. The output C1 of comparator 504 is a logical 1 until the supply voltage $V_{DD}$ is less than the minimum voltage threshold value VDDL. When the supply voltage $V_{DD}$ is less than the minimum voltage threshold value VDDH, the output C0 is a logical 1. Thus, when the output C0 transitions from a logical 1 to a logical 0, the logic module 506 asserts the auxiliary power supply control signal AUXCNTL as a value equal to $V_{DD}$. When the output C1 transitions from a logical 1 to a logical 0, the logic module 506 deasserts the auxiliary power supply control signal AUXCNTL as a value equal to approximately 0V. Thus, the auxiliary power supply controller 500 functions as a hysteretic controller to control the value of auxiliary power supply control signal AUXCNTL and, thereby, control the auxiliary power supply circuitry 311.

Thus, the electronic system controls the transfer of energy from a primary-winding of a flyback switching power converter to a secondary-winding and to an auxiliary-winding for an auxiliary power supply 314 during mutually exclusive periods of time. Thus, the electronic system can, in at least one embodiment, precisely determine an amount of charge transferred to the secondary-winding and then to a load.

Although embodiments have been described in detail, it should be understood that various changes, substitutions, and alterations can be made hereto without departing from the spirit and scope of the invention as defined by the appended claims.

What is claimed is:

1. An apparatus comprising:
   a flyback type switching power converter, wherein the switching power converter includes a transformer having a primary-winding, a secondary-winding, and an auxiliary-winding;
   a first switch coupled to the primary-winding;
   an auxiliary power supply that includes auxiliary power supply control circuitry coupled to the auxiliary-winding; and
   a controller coupled to the first switch configured to provide a control signal and configured to (i) control the first switch and current in the primary winding and (ii) control the auxiliary power supply circuitry to isolate a transfer of energy from the primary-winding to the secondary-winding from a transfer of energy from the primary-winding to the auxiliary-winding,
   wherein the auxiliary power supply having the auxiliary-winding provides auxiliary power to the controller that provides the control signal to control the transferring of energy from the primary-winding, and the secondary-winding delivers energy for a load of the switching power converter, and
   a capacitor coupled to the controller and to a Zener diode, and a supply voltage node for the controller coupled to the Zener diode, wherein the capacitor and Zener diode are coupled to a current control node of the second switch.

2. The apparatus of claim 1 wherein the auxiliary power supply control circuitry comprises the auxiliary-winding, a diode coupled to a first terminal of the auxiliary-winding, and a second switch coupled to the diode.

3. The apparatus of claim 1 wherein the capacitor stores charge to maintain an approximately constant supply voltage for controller.

4. The apparatus of claim 1 wherein the controller depletes charge from the capacitor when the auxiliary power supply is not operating.

5. The apparatus of claim 1, wherein the controller is configured to at least control a transfer of energy from the primary winding of the transformer to the secondary-winding of the switching power converter and to the auxiliary-winding for the auxiliary power supply during mutually exclusive periods of time.

6. The apparatus of claim 5 wherein the periods of time comprise successive switching cycles of a switch that controls the transferring of energy from the primary-winding.

7. The apparatus of claim 5 wherein the controller is configured to at least control a first value of a reflected voltage of the auxiliary-winding of the transformer to be lower than a reflected voltage of the secondary winding of the transformer during transfer of energy to the auxiliary-winding and controlling a second value of the reflected voltage of the auxiliary.

8. The apparatus of claim 1 wherein the controller is configured to
   cause the first switch to conduct current flow in the auxiliary-winding of the transformer; and
   cause the first switch to stop conducting current flow in the auxiliary-winding of the transformer and allow current to flow in the secondary-winding of the transformer.

9. The apparatus of claim 8 wherein the controller is configured to control the first switch to conduct current flow in the secondary-winding of the transformer until a predetermined threshold is reached.

10. The apparatus of claim 1 wherein the controller is further configured to:
    during a first period, control the transfer of energy from the primary-winding of the transformer to the secondary-winding; and
    during a second period of time, control transfer of energy from the primary-winding to the auxiliary-winding, wherein the first time period and the second time period are mutually exclusive.

11. The apparatus of claim 1 wherein the controller receives a control signal from a dimmer to modify the transfer of energy to the load.

12. The apparatus of claim 11 wherein the dimmer is a triac-based dimmer.

13. The apparatus of claim 11 wherein the load is a lamp.

* * * * *